Jan. 7, 1930.  J. P. HARRIS  1,742,470
PRESS
Filed July 25, 1927  4 Sheets-Sheet 2
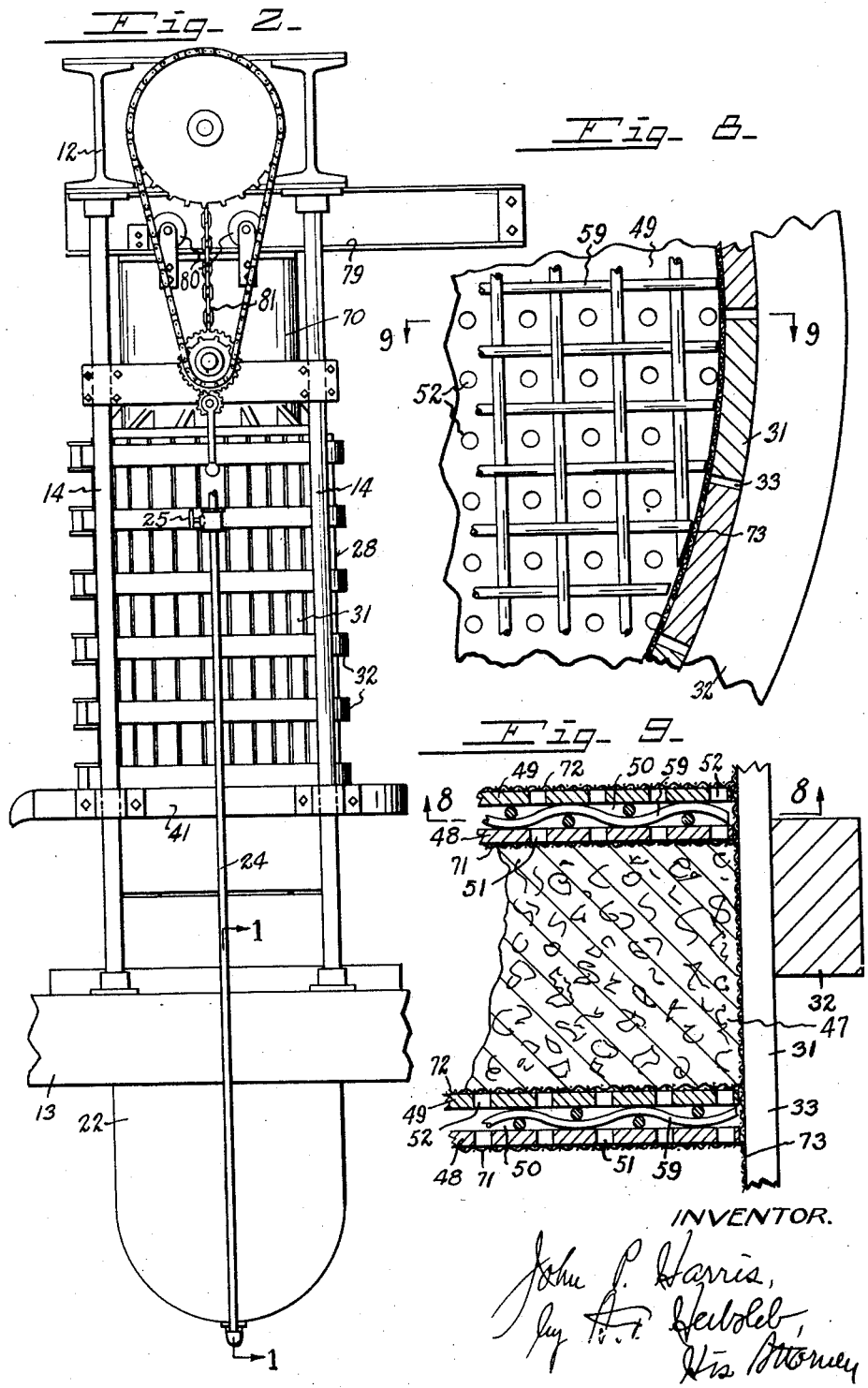

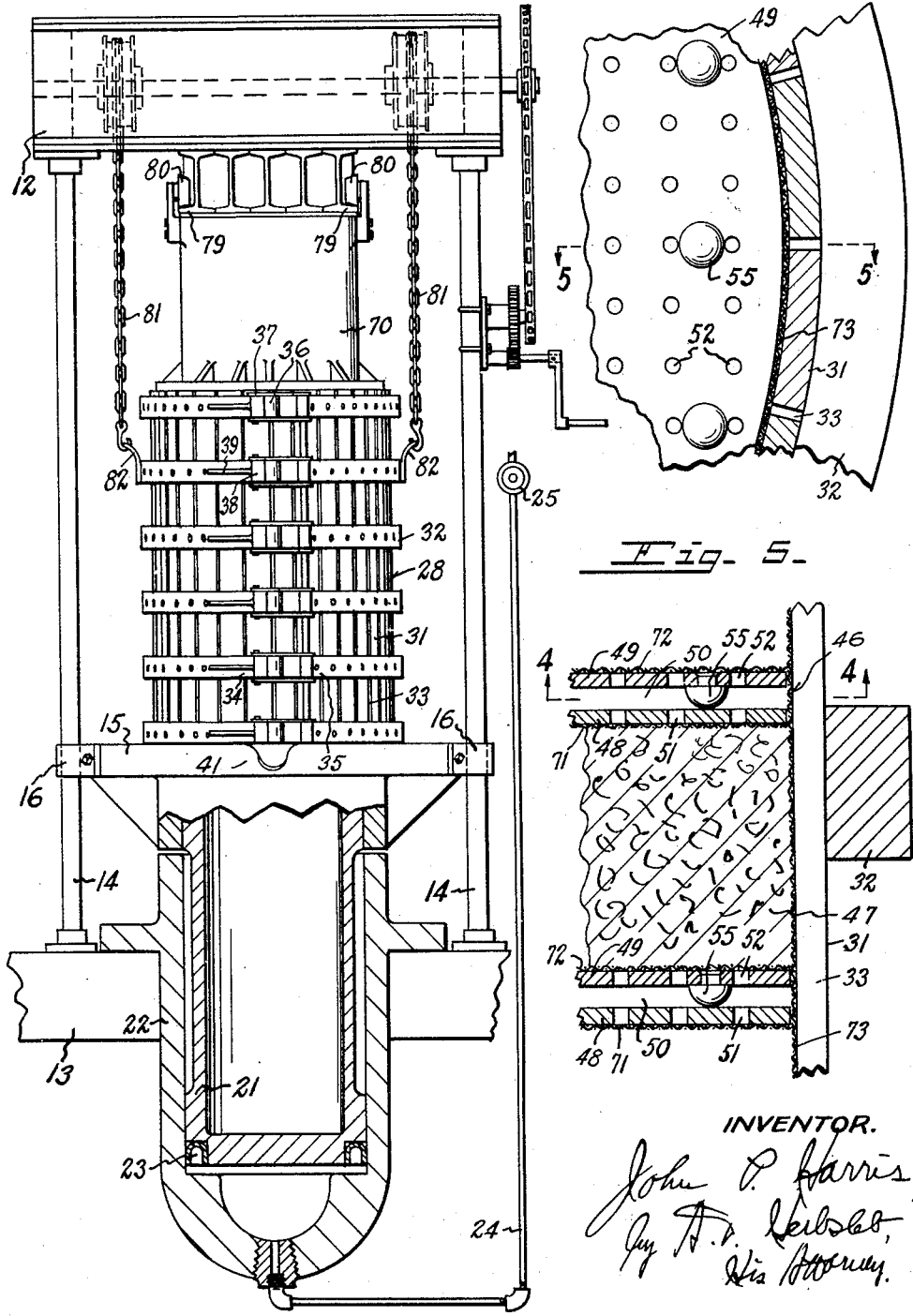

Jan. 7, 1930.  J. P. HARRIS  1,742,470
PRESS
Filed July 25, 1927  4 Sheets-Sheet 3
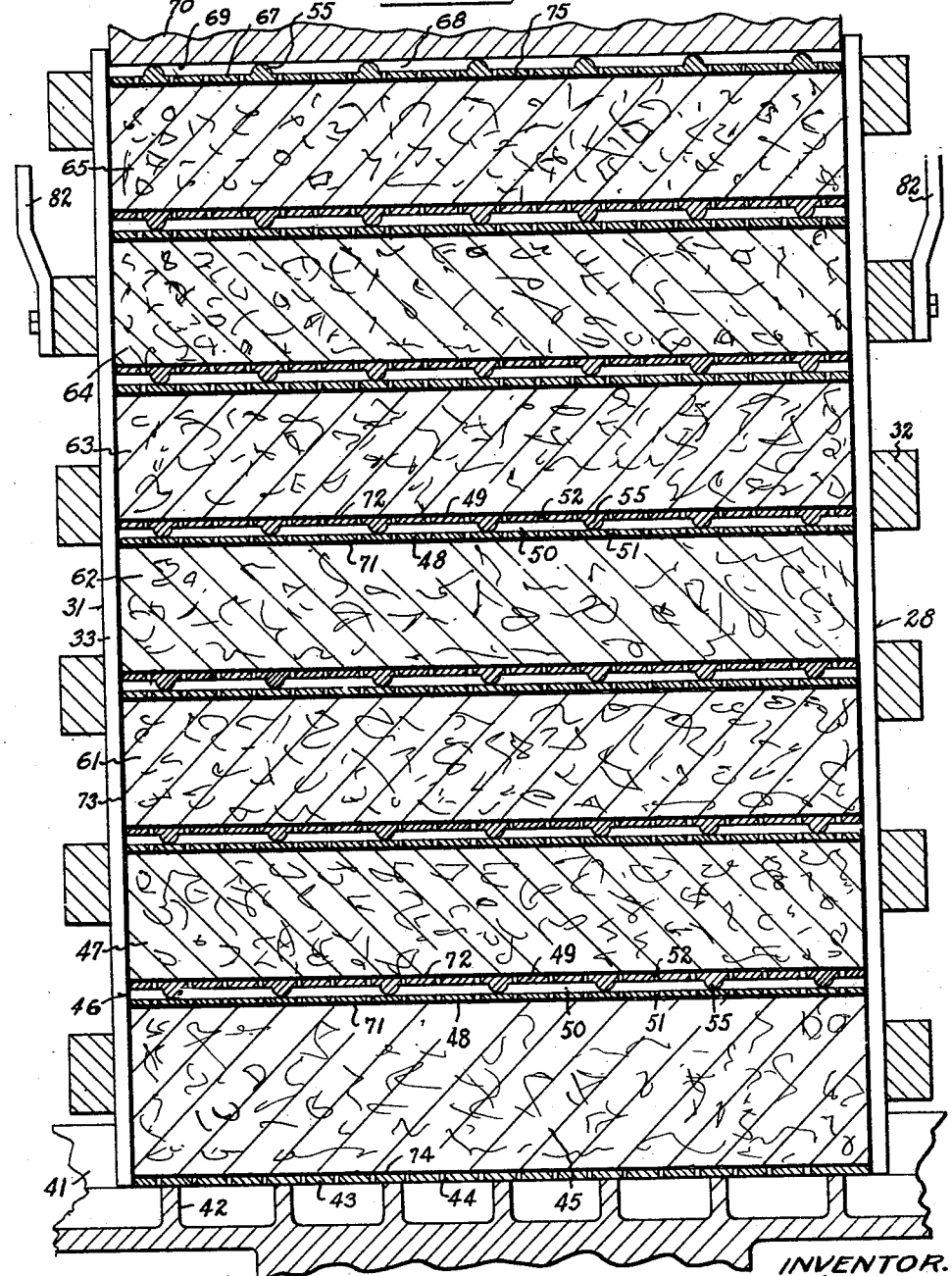
INVENTOR.

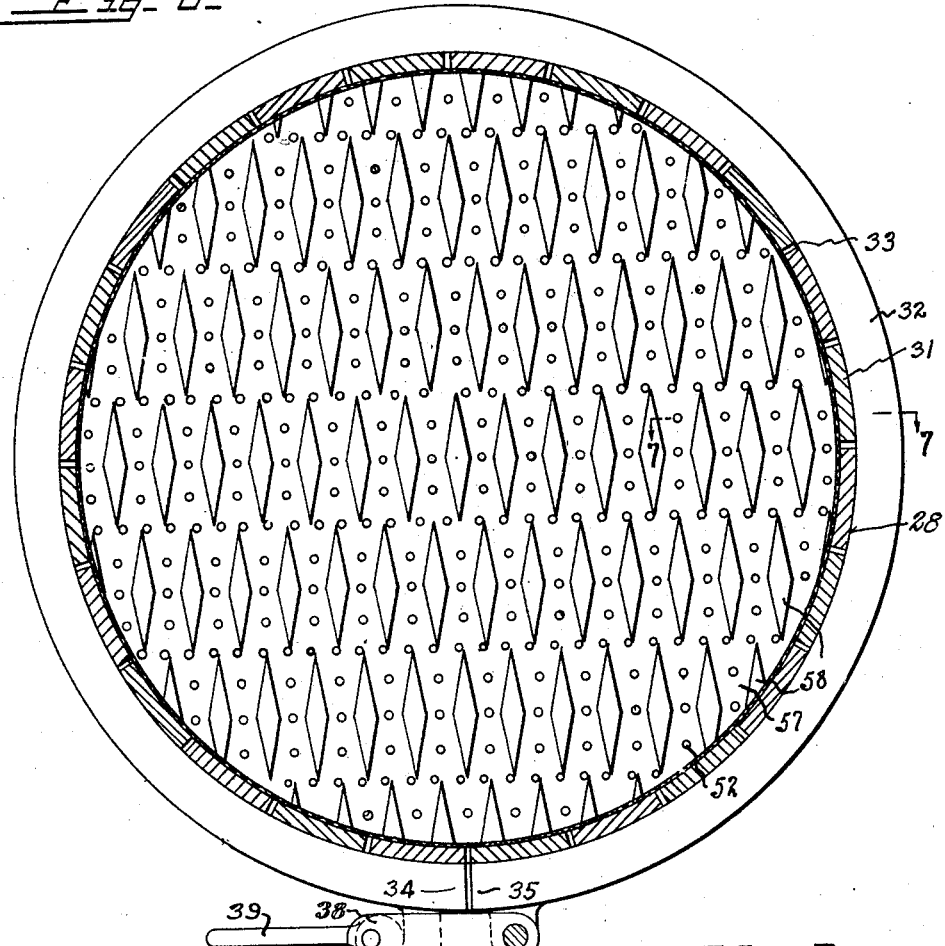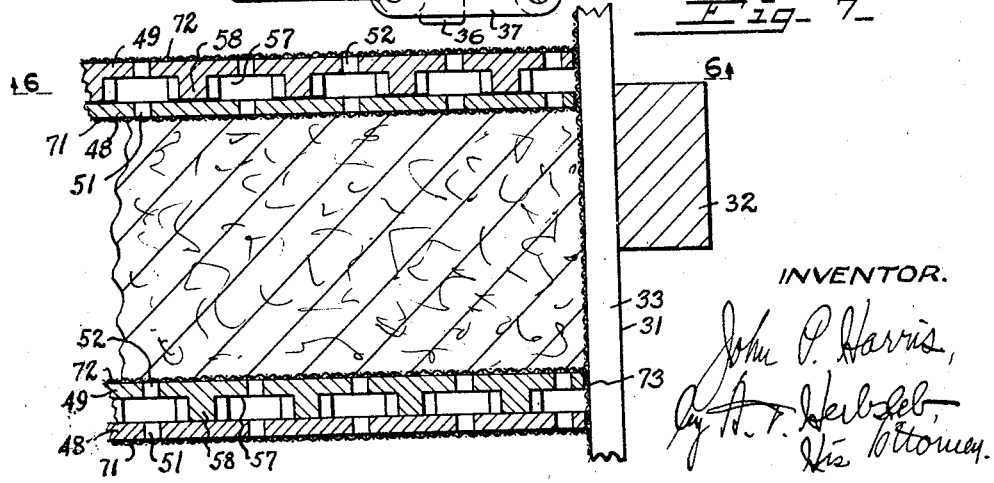

Patented Jan. 7, 1930

1,742,470

UNITED STATES PATENT OFFICE

JOHN P. HARRIS, OF CHICAGO, ILLINOIS, ASSIGNOR TO THE CINCINNATI BUTCHERS' SUPPLY COMPANY, OF CINCINNATI, OHIO, A CORPORATION OF OHIO

PRESS

Application filed July 25, 1927. Serial No. 208,256.

My invention relates to presses arranged to press material for extracting liquid therefrom, and it is the object of my invention to provide novel means whereby the extraction of the liquid is more effective in order to produce a greater yield of liquid, and to produce drier cakes of the solids of the material, than has heretofore been usual in presses of this character.
Instancing the extraction of fats from cracklings, as now usual in general practice, the heated cracklings, comprising the solids and the liquid, are placed in the curb of a curb press, and pressure is applied to the material in the curb to cause passage of liquid laterally through the body of the material and through the openings in the side walls of the curb, with the result that there is an appreciable amount of retained liquid in the material after the same has been pressed, the proportion of retained liquid increasing with the distance from the wall of the curb.

It is the object of my invention to provide new and improved means whereby the extraction of liquid from the solids is enhanced; further, to provide passages for the liquid in the body of the material being pressed; further, to provide perforated plates between layers of material in the press and lateral passages between the plates communicating with the perforations in the plates for ready passage of liquid from the body of the material; further, to provide novel means for maintaining perforations for the liquid clear of the particles of solids in the material; and, further, to provide new and improved means for pressing cracklings whereby to increase the yield of fats therefrom and to produce drier cracklings.
The invention will be further readily understood from the following description and claim, and from the drawings in which latter;

Fig. 1 is a front elevation of a press embodying my invention, the same being partly broken away, and partly in axial section on the line 1—1 of Fig. 2.

Fig. 2 is a side elevation of the same.

Fig. 3 is an axial section of an exemplifying curb and its contents, showing my invention in connection with a press, partly broken away.

Fig. 4 is a horizontal section of a detail of my improved device, taken in the plane of the line 4—4 of Fig. 5.
Fig. 5 is a cross-section of the same, taken in the plane of the line 5—5 of Fig. 4.

Fig. 6 is a cross-section of my improved device, taken in the plane of the line 6—6 of Fig. 7, showing a modification.
Fig. 7 is a cross-section of the same, taken in the plane of the line 7—7 of Fig. 6.

Fig. 8 is a cross-section of my improved device, taken on the line 8—8 of Fig. 9, showing a further modification; and,
Fig. 9 is a cross-section of the same, taken in the plane of the line 9—9 of Fig. 8.

The press is exemplified as a hydraulic press, it being understood that water, oil or other pressure media usually employed may be used as the pressure medium in the press exemplified. The press comprises a head 12, a base 13 and uprights 14 between the base and the head. The uprights serve as guides for the ram 15 of the press. The ram is provided with bearings 16 which are received about the uprights for being guided thereby.

A piston 21 depends from and is fixed to the ram, and has reciprocation in a cylinder 22, there being a usual packing 23 on the piston between the piston and the wall of the pressure chamber in the cylinder. A usual pressure piping 24 communicates with the cylinder from a suitable source of pressure, for delivering compressed fluid to the pressure chamber in the cylinder, and thereby exerting pressure upon the ram. A valve 25 in the pressure pipe controls this pressure. Suitable exhaust passages for the pressure chamber for returning the fluid to the source of supply may also be provided, but this and the other usual details of the hydraulic press are not more fully shown and described, as the same are of usual or ordinary construction.
94
A material chamber 28 is mounted on the ram. This material chamber is exemplified as a curb, which is an enclosing wall for the material. The material may be instanced as so-called cracklings which are the residue in rendering operations in slaughter house and meat packing plants, and in plants for rendering offal and carcasses, but may be other material, such as oil-containing fish products, or other liquid or juice containing material.

The cracklings exemplified are pressed while of sufficiently high temperature to liquefy the fats and greases therein, so that the liquefiable fats and greases may be readily extracted from the solids of the cracklings.

The exemplified curb comprises slats 31, secured to hoops 32 about the slats, the slats having slits 33 between them, forming openings through which the liquid passes while the liquid is being pressed.

The hoops surround the series of slats and have separable ends 34, 35, which are arranged to be pressed toward each other by suitable clamps, for completing the wall of the curb, and to be separated from each other, in order to enlarge the diameter of the curb and provide ready separation between the curb and its pressed contents. Thus one end of each hoop is provided with a hook 36 and the other end has links 37 pivoted thereto, a cam 38 being pivoted to the free ends of the links for cooperating with the hook, the cam being provided with a handle 39. Prior to charging the material into the curb, the separable ends of the wall of the curb are connected so that the curb will resist pressure in the inside thereof.

The ram is provided with a saucer 41, for receiving the expressed fluid, the saucer being provided with ribs 42. The curb is placed endwise on the saucer, resting on the ribs. A plate 43 provided with holes 44 is placed inside the curb upon the ribs.

A layer 45 of the material, for instance cracklings, is laid upon the plate 43, and spread evenly thereon. Separating means 46 are placed between said layer and the succeeding layer 47 of material which is placed in the curb. These separating means are exemplified as comprising walls 48, 49, which have a space 50 therebetween. These walls are exemplified as plates.

The respective plates have holes 51, 52, therein, forming perforations in the plates between the respective layers 45, 47, of the material and the space or passage 50 between said plates. The spacing of the plates is shown formed by means of projections 55 shown projecting into the space from one of the plates. The object is to provide a channel extending lengthwise of the walls or plates between said walls or plates for receiving the liquid from the material through said plates. The projections 55 are shown as the heads of rivets upset in one of the plates.

This channel may be provided by indentations 57 between projections 58, such exemplification being shown in the modification illustrated in Figs. 6 and 7. These plates may be steel plates and the projections may be formed therein while forming the plate.

Such transverse channel may also be provided by means of a wire meshing, exemplified at 59 in the further modification illustrated in Figs. 8 and 9, located between the plates. In this modification the crossing wires form the projections and the space between the crossing points of the wires form the indentations or channel.

Other forms of passage for the liquid lengthwise of the plates may be provided.

Other layers of material, called cheeses in practice, as exemplified at 61, 62, 63, 64, 65, may be placed into the curb, separated by similar separating means, designated by similar reference numerals. A perforated plate 67 may be placed on the end or upper layer of material with its projections 55 projecting upwardly, for forming a channel 68 between it and the lower face 69 of a plunger 70.

The material comprises liquid containing solids. In order to avoid squeezing of solid particles into the perforations, apertures or holes, porous sheets 71, 72, are located between the layers of material and the plates 48, 49. If desired, the inside face of the wall of the curb may be provided with a porous sheet 73, and the layers of material and separating plates filled into such lined curb. The porous sheet 73 forms a lining between the material and the curb, for arresting the solids of the material, and preventing their entry into the apertures in the curb. A porous sheet 74 may be placed on the plate 43 and a porous sheet 75 may be placed under the plate 67. These porous sheets may for instance be sheets of so-called duck or canvas fabric or cloth.

When the desired number of layers of material have been placed in the curb or retaining wall for the material, with said separating means between them, a plunger is moved into central position above the curb.

The plunger is supported from the upper portion of the press, as by supporting the same from tracks 79 depending from the head 12. Rollers 80, from which the plunger is suspended, run on the tracks. The plunger is moved along the tracks away from the curb, so as to be out of the way whilst charging the curb. When the curb has been charged, the plunger is moved to a position central above the curb.

Pressure is then applied to the material by means of the ram, which in the present exemplification rises upon opening of the valve 25 for pressing the contents of the curb between the ram and the plunger. The wall of the curb is received about the plunger, and is in the present instance raised with relation to the plunger.

Exemplifying the operation of the device it may be instanced, referring to Figs. 1 to 5, that the curb illustrated is twenty-four inches in diameter, that the layers of material are four inches thick, and that the porous linings may be of No. 8 duck cloth, and that the perforations in the plates and the apertures in the curb are such as to permit ready extraction of the liquid out of the material. The perforations in the plates may be instanced as one-fourth inch in diameter and their centers as one inch apart. The proximate faces of the plates may be three-eighths of an inch apart, and the passages between the plates of sufficient width to readily carry off the flow of liquid. The projections may be three-fourths of an inch in diameter and the passages three inches wide. The plates may be instanced as one-fourth inch thick. The openings in the curb are sufficiently large to readily permit the outflow of the fluid. These dimensions are given as examples and not to be treated as restrictive in any sense.

The liquid is forced through the perforations in the plates, and is caused to enter the passage between the walls of the separating means, and to be forced through said passage lengthwise of the plates through the apertures in the curb. The liquid has only a short distance to travel through the material. The layers being shallow, for instance, four inches thick, the greatest distance which any portion of the liquid must travel through the material being pressed is approximately two inches. The liquid may also move through the material in various directions and be pressed through any of the perforations in the plates and may also be pressed through the wall of the curb as by being forced through the apertures therein.

The liquid in the material, is, by my improved device, substantially all extracted from the material, leaving practically air dry cakes or layers of solids. Analyses have shown that by my improved device the dryness of pressed cracklings has been increased substantially fifty (50) percent over the dryness of pressed cracklings pressed by apparatus now in general use in this industry.

It will be understood that when cracklings are pressed, the cracklings should be in warm or heated state and at temperatures ranging as an example from 100 to 200 degrees Fahrenheit, being advisedly at about 160 degrees Fahrenheit. A pressure ranging from 800 pounds per square inch to 3000 pounds per square inch may be applied to the material.

Referring particularly to Figs. 6 and 7, the projections are of elongated diamond form. These elongated diamond formed projections are arranged in rows with their sides of greater length arranged side by side and spaced apart, and the projections in neighboring rows are arranged in staggered relation so that the projections in one row are in registry with the spaces between projections in the neighboring row. The neighboring rows of projections are spaced apart. Rows of holes are arranged in the spaces between projections, these rows of holes extending lengthwise in said spaces, and rows of holes are arranged lengthwise in the spaces between the rows of projections. By this arrangement a great many expressing holes are provided in the plates and great resistance surfaces between plates are provided, so as to permit great pressure to be exerted upon the material and the liquid in the material to be quickly expressed, and at the same time a maximum area of draining channels is provided for quick draining of the expressed liquid. This structure and arrangement is especially effective in a device of this character.

When the pressing of the material has been completed, the curb is caused to descend, as by closing the valve 25 and by opening the usual draining valves for draining the fluid in the ram cylinder. The curb is opened, as by releasing the clamps thereof, which causes the curb to spread and release the pressed material, the curb being then raised, as by means of usual raising chains 81, releasably attached to hooks 82 on the curb, so as to expose the body of pressed material.

If any of the extracted fluid remains in the passages of the separating means between the layers, this may be readily removed and saved, as by applying an air blast to said passages. If desired, said passages may be drained when the separating devices are removed. If desired, the body of pressed material with the separating devices therebetween may be laid on edge for draining any liquid which may be located in the passages between the walls of the separating devices. The lining 73 may be removed from about the pressed material and the porous sheets between the material and the separating means may also be removed, and this lining and these porous sheets reused in succeeding pressings.

Having thus fully described my invention, what I claim is new, and desire to secure by Letters Patent, is:

In a curb press, the combination of a curb provided with openings for passage of liquid and arranged for receiving layers of material to be pressed, and separating plates between said layers of material, said separating plates provided with projections of elongated diamond form, said elongated diamond formed projections arranged in rows on said plate with their sides of greater length arranged side by side and said projections in said respective rows having spaces between them, said plate provided with rows of holes in said spaces, the projections in each row being in registry with the spaces between projections in neighboring rows, said neighboring rows of projections having spaces between them, and said plate provided with rows of holes in said last named spaces.

In testimony whereof, I have hereunto signed my name.

JOHN P. HARRIS.